United States Patent
Sudhir et al.

(10) Patent No.: US 11,107,302 B2
(45) Date of Patent: Aug. 31, 2021

(54) METHODS AND SYSTEMS FOR EMERGENCY EVENT MANAGEMENT

(71) Applicant: HERE GLOBAL B.V., Eindhoven (NL)

(72) Inventors: Rahul Sudhir, Mumbai (IN); Sanjeev Kumar, Navi Mumbai (IN)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/417,091

(22) Filed: May 20, 2019

(65) Prior Publication Data
US 2020/0372727 A1   Nov. 26, 2020

(51) Int. Cl.
| | | |
|---|---|---|
| G07C 5/00 | (2006.01) | |
| G08B 25/01 | (2006.01) | |
| G08G 1/09 | (2006.01) | |
| H04W 4/90 | (2018.01) | |
| B60W 50/00 | (2006.01) | |

(52) U.S. Cl.
CPC ......... *G07C 5/008* (2013.01); *B60W 50/0098* (2013.01); *G07C 5/002* (2013.01); *G08B 25/016* (2013.01); *G08G 1/091* (2013.01); *H04W 4/90* (2018.02); *B60W 2520/04* (2013.01); *B60W 2520/105* (2013.01); *B60W 2540/18* (2013.01); *B60W 2556/55* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 6,076,028 A | 6/2000 | Donnelly et al. | |
| 6,326,903 B1 * | 12/2001 | Gross | G08G 1/087 340/902 |
| 6,958,707 B1 * | 10/2005 | Siegel | G08G 1/087 340/435 |
| 9,457,754 B1 | 10/2016 | Christensen et al. | |
| 9,635,500 B1 * | 4/2017 | Becker | H04W 4/021 |
| 9,886,841 B1 | 2/2018 | Nave et al. | |

(Continued)

FOREIGN PATENT DOCUMENTS

| | | |
|---|---|---|
| EP | 0915443 A2 | 5/1999 |
| EP | 3251897 A1 | 12/2017 |

OTHER PUBLICATIONS

Ahirrao et al., "Accident Detection and Notification System Using Android", published in International Journal on Recent and Innovation Trends in Computing and Communication, vol. 3, Issue: 3, Mar. 2015, pp. 1084-1086.

*Primary Examiner* — Curtis J King
(74) *Attorney, Agent, or Firm* — Ditthavong, Steiner & Mlotkowski

(57) ABSTRACT

A method, a system, and a computer program product for generating emergency event notification data are disclosed herein. The method, for example, comprises determining an emergency event, based on first sensor data. The method further includes determining vehicle behavior of a first vehicle, based on the determined emergency event and generating the emergency event notification data corresponding to the emergency event, based on the determined vehicle behavior. The method may further include transmitting at least one emergency event notification to at least one recipient, based on the generated emergency event notification data.

20 Claims, 5 Drawing Sheets

(56) References Cited

U.S. PATENT DOCUMENTS

| | | | |
|---|---|---|---|
| 9,894,478 B1* | 2/2018 | DeLuca | H04W 4/022 |
| 10,042,359 B1* | 8/2018 | Konrardy | B60R 25/252 |
| 10,043,372 B1 | 8/2018 | Hollenstain et al. | |
| 10,147,320 B1* | 12/2018 | Ellis | G08G 1/163 |
| 10,531,224 B1* | 1/2020 | Lemieux | H04W 4/024 |
| 10,559,208 B1* | 2/2020 | McAlpine | E01C 19/004 |
| 2003/0141990 A1* | 7/2003 | Coon | G08G 1/0965 |
| | | | 340/902 |
| 2003/0169181 A1* | 9/2003 | Taylor | G08G 1/00 |
| | | | 340/902 |
| 2004/0246144 A1* | 12/2004 | Siegel | G08G 1/087 |
| | | | 340/902 |
| 2004/0263355 A1* | 12/2004 | Carroll | G08G 1/0965 |
| | | | 340/907 |
| 2007/0142028 A1* | 6/2007 | Ayoub | H04M 3/5116 |
| | | | 455/404.1 |
| 2007/0159309 A1* | 7/2007 | Ito | G16H 10/20 |
| | | | 340/425.5 |
| 2007/0159354 A1* | 7/2007 | Rosenberg | G08G 1/0965 |
| | | | 340/902 |
| 2011/0018736 A1* | 1/2011 | Carr | G08G 1/0965 |
| | | | 340/902 |
| 2011/0068949 A1* | 3/2011 | Ieda | G08G 1/0965 |
| | | | 340/902 |
| 2011/0178811 A1* | 7/2011 | Sheridan | G01C 21/362 |
| | | | 705/1.1 |
| 2011/0256881 A1* | 10/2011 | Huang | G01S 5/0257 |
| | | | 455/456.1 |
| 2012/0313792 A1* | 12/2012 | Behm | G08G 1/0965 |
| | | | 340/902 |
| 2013/0105583 A1* | 5/2013 | Peterson | A01M 7/0089 |
| | | | 235/492 |
| 2013/0110292 A1* | 5/2013 | Peterson | A01C 21/00 |
| | | | 700/283 |
| 2013/0110357 A1* | 5/2013 | Peterson | A01M 7/0089 |
| | | | 701/50 |
| 2013/0130639 A1 | 5/2013 | Oesterling et al. | |
| 2013/0135118 A1* | 5/2013 | Ricci | G06N 5/02 |
| | | | 340/932.2 |
| 2013/0173474 A1* | 7/2013 | Ranganathan | G06Q 20/0655 |
| | | | 705/67 |
| 2013/0279491 A1* | 10/2013 | Rubin | H04W 76/50 |
| | | | 370/347 |
| 2013/0295970 A1* | 11/2013 | Sheshadri | G01S 19/34 |
| | | | 455/456.6 |
| 2013/0326137 A1* | 12/2013 | Bilange | G06F 12/0866 |
| | | | 711/113 |
| 2014/0121932 A1* | 5/2014 | Zeng | B60W 10/184 |
| | | | 701/93 |
| 2014/0172531 A1* | 6/2014 | Liberty | G06Q 20/3276 |
| | | | 705/14.23 |
| 2014/0354449 A1* | 12/2014 | Alam | G08G 1/0965 |
| | | | 340/902 |
| 2015/0288819 A1* | 10/2015 | Brown | H04M 3/5116 |
| | | | 379/45 |
| 2016/0042767 A1* | 2/2016 | Araya | H04N 7/181 |
| | | | 386/201 |
| 2016/0094964 A1* | 3/2016 | Barfield, Jr. | G08B 25/016 |
| | | | 455/404.2 |
| 2016/0144817 A1 | 5/2016 | Chambers | |
| 2016/0154117 A1* | 6/2016 | Baudia | G01S 19/48 |
| | | | 342/357.31 |
| 2017/0018187 A1* | 1/2017 | Kim | G08G 1/166 |
| 2017/0098372 A1* | 4/2017 | Eilertsen | G08G 1/0133 |
| 2017/0193821 A1* | 7/2017 | Baranga | G08G 1/042 |
| 2017/0241660 A1* | 8/2017 | Sekar | F24F 11/30 |
| 2017/0366930 A1* | 12/2017 | Treman | G01C 21/32 |
| 2018/0005523 A1* | 1/2018 | Gahan | G08G 1/087 |
| 2018/0079359 A1* | 3/2018 | Park | G01S 13/931 |
| 2018/0087914 A1* | 3/2018 | Bravo | G08G 1/0965 |
| 2018/0090000 A1* | 3/2018 | Bravo | G08G 1/0965 |
| 2018/0121956 A1* | 5/2018 | DeLuca | G06Q 30/0261 |
| 2018/0122237 A1* | 5/2018 | Nascimento | G08G 1/0965 |
| 2018/0204447 A1* | 7/2018 | Morgan | G08B 27/006 |
| 2018/0232767 A1* | 8/2018 | Garg | H04W 4/021 |
| 2018/0268690 A1* | 9/2018 | Gebers | G08G 1/163 |
| 2018/0322785 A1* | 11/2018 | Jerichow | G08G 1/096716 |
| 2019/0019297 A1* | 1/2019 | Lim | G06K 9/00979 |
| 2019/0027032 A1* | 1/2019 | Arunachalam | G08G 1/0965 |
| 2019/0035269 A1* | 1/2019 | Donovan | G08G 1/0965 |
| 2019/0073905 A1* | 3/2019 | Nishimura | G08G 1/166 |
| 2019/0088106 A1* | 3/2019 | Grundstrom | H04W 4/90 |
| 2019/0088148 A1* | 3/2019 | Jacobus | B60W 10/18 |
| 2019/0236957 A1* | 8/2019 | Hayakawa | G08G 1/09 |
| 2020/0160714 A1* | 5/2020 | Inaba | H04W 4/46 |
| 2020/0192355 A1* | 6/2020 | Lu | B60W 30/08 |
| 2020/0193829 A1* | 6/2020 | Cheng | H04W 4/46 |
| 2020/0238981 A1* | 7/2020 | Seo | B60W 50/14 |
| 2020/0276973 A1* | 9/2020 | Meijburg | B60Q 1/503 |

* cited by examiner

METHODS AND SYSTEMS FOR EMERGENCY EVENT MANAGEMENT

FIELD OF THE PRESENT DISCLOSURE

The present disclosure generally relates to an emergency response system for detecting road accidents. More specifically, the disclosure relates to the emergency response system functional in hit-and-run accidents.

BACKGROUND

In case of a traffic collision or an emergency event, an emergency service team, such as, a medical emergency team, law enforcing bodies, fire brigade, etc., ideally reach the site of the collision to rescue the victim and/or catch hold of the perpetrators. However, the emergency service teams may have to be notified by the victims in the collision or surrounding observers personally. Further, the manual notification of an occurrence of an accident may be inaccurate due to a mistake, a desire to shift blame, or in some cases, a desire to overstate the severity of the accident. Further, in case of a severe accident where the victim, may be a pedestrian, or an individual in a moving or a stationary vehicle is critically injured, a loss in time to raise a SOS call to a medical emergency team may be critical to the survival of the victim.

However, in few road accidents like, hit-and-run cases, it is hard to identify a perpetrator who collides with the victim and fails to stop his/her vehicle and absconds. Further, there are hit-and-run accidents where the perpetrator strikes a parked vehicle of a victim when the victim may be away from his/her vehicle. Often no information about the perpetrator is available or it is too expensive to acquire information from sources such as traffic and surveillance cameras. If witnesses are present at the site of the road accident, their information may not prove reliable to identify the perpetrator and his/her vehicle.

SUMMARY OF INVENTION

A method, a system, and a computer program product are provided in accordance with an example embodiment described herein for generating emergency event notification data. The method, the system, and the computer program product address a need to detect the severity of an emergency event and transmit emergency event notification to the concerned departments.

In one aspect, a method for generating emergency event notification data is disclosed. The method includes: determining, by a processor, an emergency event based on first sensor data, determining vehicle behavior of a first vehicle, based on the determined emergency event; and generating the emergency event notification data corresponding to the emergency event, based on the determined vehicle behavior. The method further includes obtaining first sensor data from at least one of the first vehicle or a second vehicle, wherein one of the first vehicle or the first vehicle and the second vehicle is associated with the emergency event.

For determining vehicle behavior of the first vehicle, the method further includes obtaining second sensor data from at least one of first vehicle, the second vehicle, or an external source, based on the determined emergency event and determining the vehicle behavior of the first vehicle, based on the second sensor data. The method further includes, obtaining third sensor data associated with the emergency event and generating the emergency event notification data corresponding to the emergency event, based on the third sensor data. The method includes transmitting at least one emergency event notification to at least one recipient, based on the generated emergency event notification data.

Determining the vehicle behavior of the first vehicle includes determining change in speed data of the first vehicle over a first time period, and the method includes generating the emergency event notification data corresponding to the emergency event, based on a rate of the change in the speed data of the first vehicle over the first time period being greater than zero. Determining the vehicle behavior of the first vehicle includes determining change in lane data of the first vehicle over a second time period and the method includes generating the emergency event notification data corresponding to the emergency event, based on the change in the lane data over the second time period.

Determining the vehicle behavior of the first vehicle includes determining change in location data of the first vehicle over a third time period and the method includes generating the emergency event notification data corresponding to the emergency event, based on the change in the location data over the third time period. Determining the vehicle behavior of the first vehicle includes determining traffic signal data of the first vehicle over a fourth time period and the method includes generating the emergency event notification data corresponding to the emergency event, based on the traffic signal data of the first vehicle over the fourth time period.

The method further includes controlling a user interface for outputting a fitness status query associated with the emergency event based on the generated emergency event notification data, receiving a fitness input corresponding to the fitness status query, and determining the at least one recipient based on the received fitness input.

In another aspect, a system for generating emergency event notification data is disclosed. The system comprises at least one memory configured to store computer program code instructions and at least one processor configured to execute the computer program code instructions to: determine an emergency event, based on first sensor data, determine vehicle behavior of a first vehicle, based on the determined emergency event, and generate the emergency event notification data corresponding to the emergency event, based on the determined vehicle behavior. The at least one processor is further configured to obtain the first sensor data from at least one of the first vehicle or a second vehicle, wherein one of the first vehicle or the first vehicle and the second vehicle is associated with the emergency event. To determine the vehicle behavior of the first vehicle, the at least one processor is further configured to obtain second sensor data from at least one of the first vehicle or the second vehicle, or an external source, based on the determined emergency event, and determine the vehicle behavior of the first vehicle, based on the second sensor data.

The at least one processor is further configured to obtain third sensor data associated with the emergency event and generate the emergency event notification data corresponding to the emergency event, based on the third sensor data. The at least one processor further configured to transmit at least one emergency event notification to at least one recipient, based on the generated emergency event notification data.

To determine the vehicle behavior of the first vehicle, the at least one processor is configured to determine change in speed data of the first vehicle over a first time period; and the at least one processor is further configured to generate the emergency event notification data corresponding to the emergency event, based on a rate of the change in the speed data of the first vehicle over the first time period being greater than zero. To determine the vehicle behavior of the first vehicle, the at least one processor is configured to determine change in lane data of the first vehicle over a second time period, and the at least one processor is further configured to generate the emergency event notification data corresponding to the emergency event based on the change in the lane data over the second time period.

To determine the vehicle behavior of the first vehicle, the at least one processor is configured to determine change in location data of the first vehicle over a third time period, and the at least one processor is further configured to generate the emergency event notification data corresponding to the emergency event based on the change in the location data over the third time period. To determine the vehicle behavior of the first vehicle, the at least one processor is configured to determine traffic signal data of the first vehicle over a fourth time period, and the at least one processor is further configured to generate the emergency event notification data corresponding to the emergency event based on the traffic signal data of the first vehicle over the fourth time period.

The at least one processor is further configured to control a user interface for outputting a fitness status query associated with emergency event based on the generated emergency event notification data, receive a fitness input corresponding to the fitness status query; and determine the at least one recipient based on the received fitness input.

Embodiments of the present invention may provide a non-transitory computer-readable storage medium having computer-executable program code instructions stored therein. The computer-executable program code instructions when executed by a computer, cause the computer to carry out operations including: determining an emergency event, based on first sensor data, determining vehicle behavior of a first vehicle, based on the determined emergency event, and generating the emergency event notification data corresponding to the emergency event, based on the determined vehicle behavior.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1A:
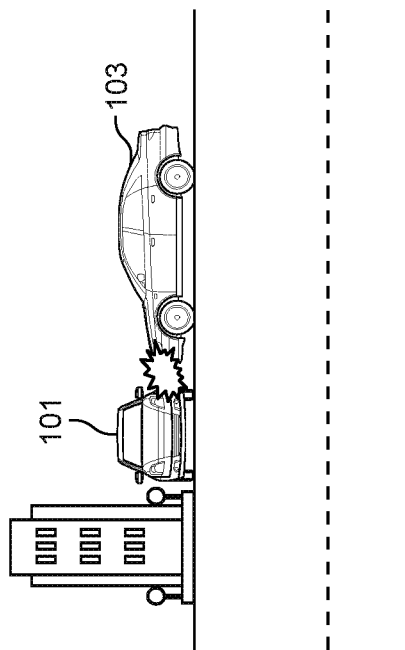
Figure 1B:
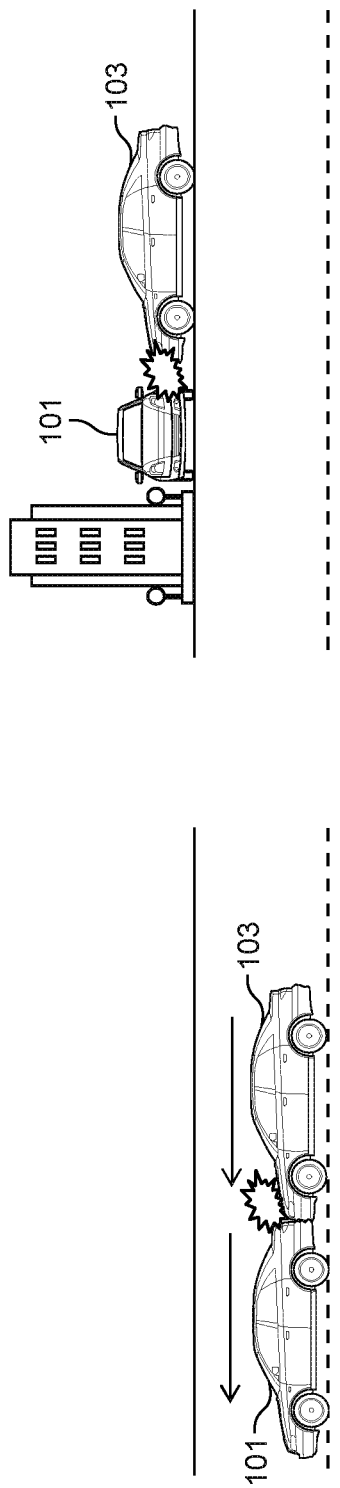
Figure 1C:
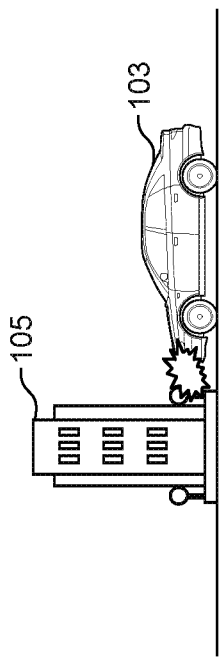
Figure 2:
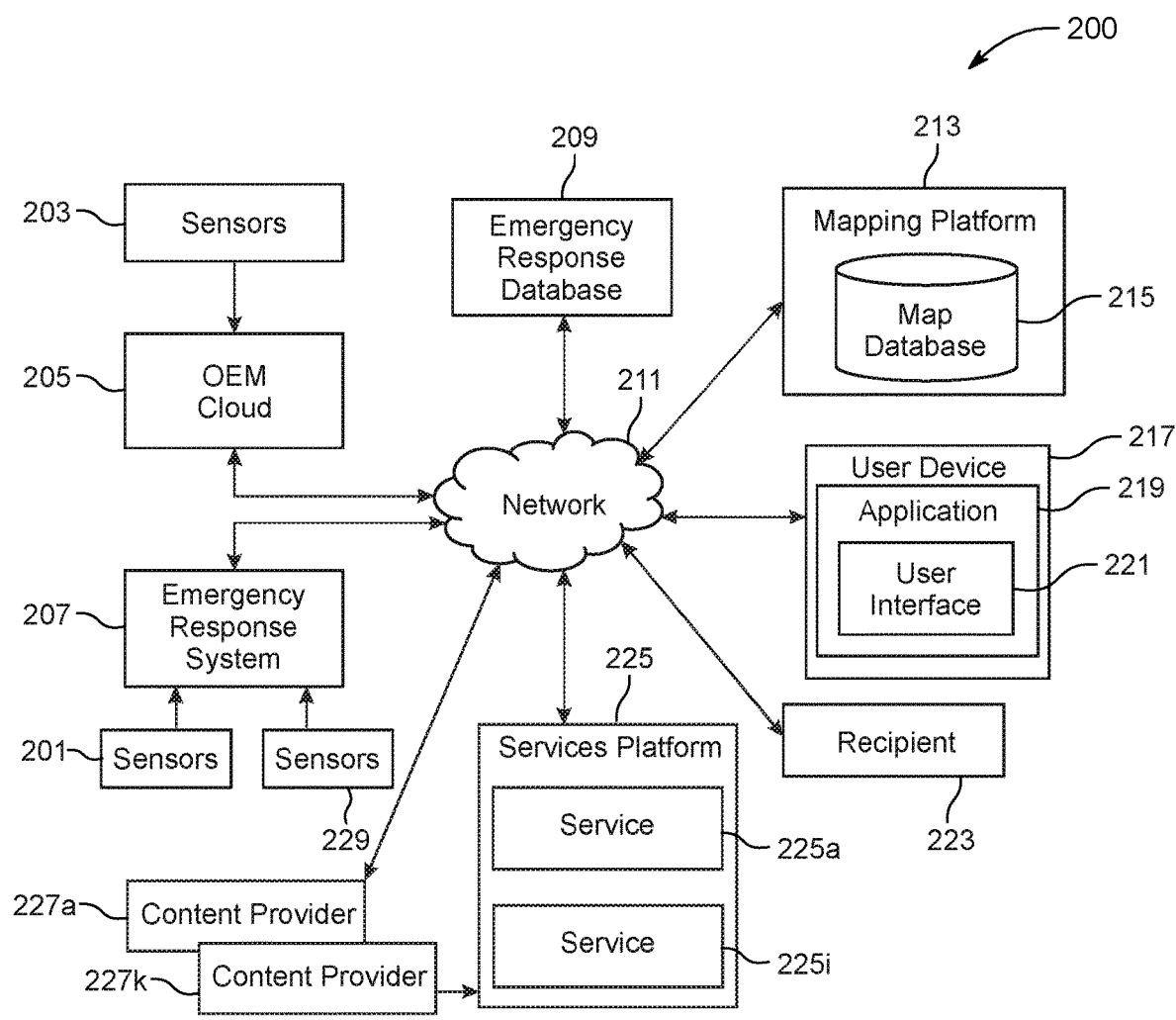
Figure 3:
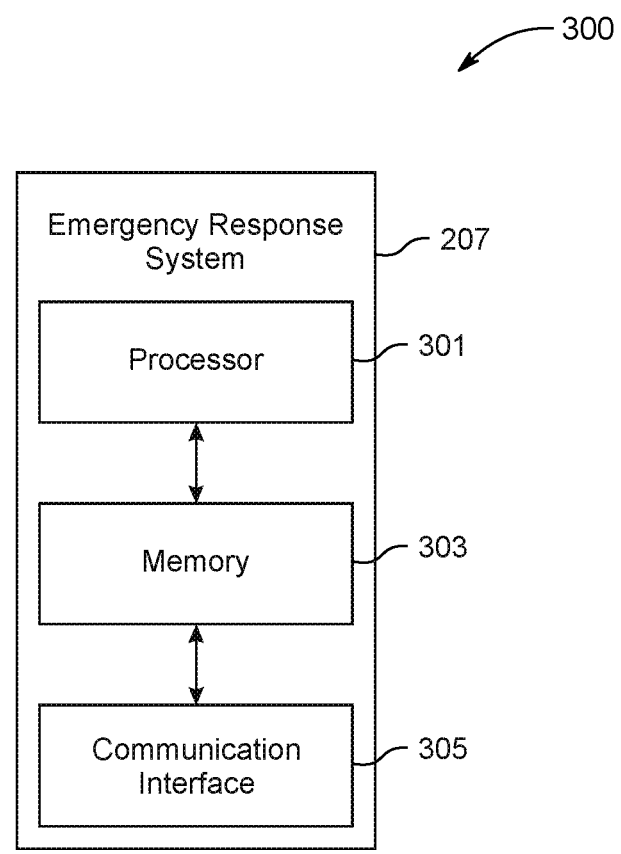
Figure 4:
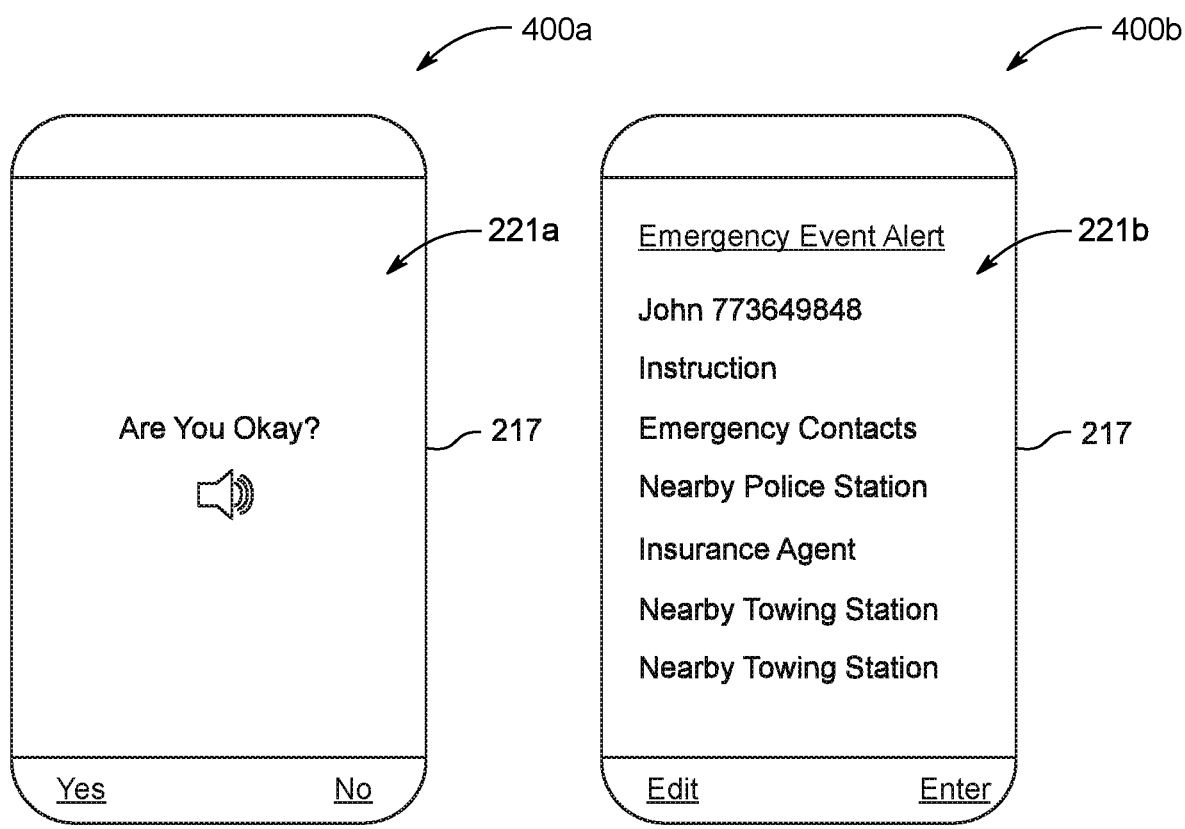
Figure 5:
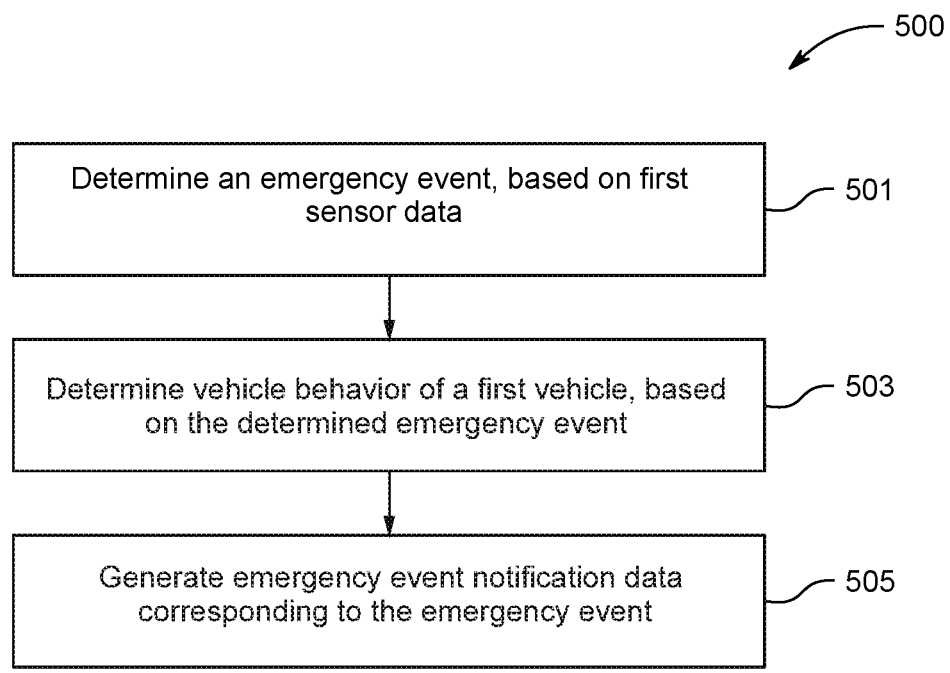

Having thus described example embodiments of the invention in general terms, reference will now be made to the accompanying drawings, which are not necessarily drawn to scale, and wherein:

FIGS. 1A-1C illustrate schematic diagrams of exemplary emergency events, where an emergency response system for generating emergency event notification data is implemented, in accordance with one or more example embodiments;

FIG. 2 illustrates a block diagram of an environment for generating emergency event notification data by the emergency response system, in accordance with one or more example embodiments;

FIG. 3 describes a block diagram of the emergency response system exemplarily illustrated in FIG. 2, in accordance with one or more example embodiments;

FIGS. 4A and 4B illustrate a fitness status query rendered on a user interface of a user device associated with a second vehicle, in accordance with one or more example embodiments; and FIG. 5 illustrates a method for generating emergency event notification data, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments described herein are for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may be used to refer to a way leading an autonomous vehicle from one place to another place. The road may have a single lane or multiple lanes.

The term "lane" may be used to refer to a part of a road that is designated for travel of vehicles.

The term "autonomous vehicle" may be used to refer to a vehicle having fully autonomous or semi-autonomous driving capabilities at least in some conditions with minimal or no human interference. For example, an autonomous vehicle is a vehicle that drives and/or operates itself without a human operator but may or may not have one or more passengers.

The term "emergency event" may be used to refer to a sudden, urgent, usually unexpected incident associated with one or more vehicles that requires assistance from one or more recipients of public assistance, such as, the police, accident rescue team, fire brigade, etc. The emergency event may be a collision between two vehicles, a collision between a vehicle and a pedestrian or a stationary object, fire in a vehicle, etc.

The term "vehicle behavior" may be used to refer to behavior of the vehicle over a period of time expressed in terms of one or more of speed of the vehicle, lane changes of the vehicle, acceleration rate, deceleration rate, running a traffic signal (breaking the law) and changes in location or distance based on a determined threshold from an accident or crash spot.

End of Definitions

A method, a system, and a computer program product are provided herein in accordance with an example embodiment for generating emergency event notification data. In some example embodiments, the method, the system, and the computer program product provided herein may further be used for transmitting the generated emergency event notification data to at least one recipient.

FIGS. 1A-1C illustrate schematic diagrams of exemplary emergency events, where an emergency response system for generating emergency event notification data is implemented, in accordance with one or more example embodiments. An emergency event, for example, a road accident may occur between two or more vehicles, such as, vehicles 101 and 103 as exemplarily illustrated in FIGS. 1A and 1B. In an exemplarily embodiment, a road accident may occur between a vehicle 101 and a stationary object, such as, a building structure 105 as exemplarily illustrated in FIG. 1C.

Considering, as exemplarily illustrated in FIGS. 1A-1B, a second vehicle, referred to as a victim vehicle 101 and a first vehicle, referred to as a culprit vehicle 103 collide with each other. The victim vehicle 101 is involved in the collision, however the victim vehicle 101 is not a perpetrator of the collision and the victim vehicle 101 and/or the passengers of the victim vehicle 101 may suffer damage. The culprit vehicle 103 is also involved in the collision and is the perpetrator in the collision. The culprit vehicle 103 may hit the victim vehicle 101 intentionally or unintentionally and/or may cause damage to the victim vehicle 101 and/or its passengers. Based on the severity of the collision, the culprit vehicle 103 and/or its passengers may also suffer some damage. The culprit vehicle 103, on hitting the victim vehicle 101, may stop and check on well-being of the passengers in the victim vehicle 101 and negotiate the damage caused to the victim vehicle 101 and the culprit vehicle 103. In an embodiment, the culprit vehicle 103 may hit the victim vehicle 101 and escape without stopping after the collision. Such road accidents are referred to as hit-and-run road accidents and the culprit vehicle 103 is difficult to nab.

Each of the vehicles 101 and 103 may be an autonomous vehicle or a manually driven vehicle. That is, in some example embodiments, the victim vehicle 101 may be an autonomous vehicle and the culprit vehicle 103 may be a manually driven vehicle. In some alternative embodiments, the victim vehicle 101 may be a manually driven vehicle and the culprit vehicle 103 may be an autonomous vehicle. In some example embodiments, both the victim vehicle 101 and the culprit vehicle 103 may be an autonomous vehicle. In some example embodiments, both the victim vehicle 101 and the culprit vehicle 103 may be manually driven vehicles. The autonomous vehicle may be a vehicle having autonomous driving capabilities at least in some conditions. The autonomous vehicle may have fully autonomous or semi-autonomous driving capabilities at least in some conditions with minimal or no human interference. For example, an autonomous vehicle may be a vehicle that drives and/or operates itself without a human operator but may or may not have one or more passengers. The collision between the victim vehicle 101 and the culprit vehicle 103 may occur while both the vehicles are traveling in same direction as exemplarily illustrated in FIG. 1A, or in an opposite direction.

In some example embodiments, the culprit vehicle 103 may collide with the stationary victim vehicle 101 in a parking spot or the victim vehicle 101 that stopped at a traffic signal, etc., as exemplarily illustrated in FIG. 1B. In some example embodiments, an emergency event may occur when the culprit vehicle 103 collides with a stationary object, such as, a building structure 105 as exemplarily illustrated in FIG. 1C. The stationary object may be a pole, a tree, a rock, etc. The culprit vehicle 103 may cause damage to the stationary object due to the collision. In some example embodiments, the culprit vehicle 103 may collide with a pedestrian, that may be stationary or in motion, and cause damage to the pedestrian. In some example embodiments, the emergency event, for example, a pile up of vehicles in snowy conditions, may involve one or more victim vehicles such as, 101 and one or more culprit vehicles, such as, 103.

The emergency response system as disclosed in the detail description of FIG. 3 generates and transmits emergency event notifications to one or more recipients, such as, the police station, a hospital, an accident rescue team, etc., in the vicinity of the site of the emergency event.

FIG. 2 illustrates a block diagram of an environment 200 for generating emergency event notification data by the emergency response system 207, in accordance with one or more example embodiments. The environment 200 may include one or more sensors 201 associated with the victim vehicle 101, one or more sensors 203 associated with the culprit vehicle 103, and the emergency response system 207 in communication with a mapping platform 213 over a network 211. The sensors 201 and 203 may be built-in or embedded into or within interior of the victim vehicle 101 and the culprit vehicle 103, respectively. In some embodiments, the sensors 201 and 203 may be present in a user device, such as, 217 in the victim vehicle 101 and the culprit vehicle 103, respectively. The sensors 201 of the victim vehicle 101 are in communication with a control unit of the victim vehicle 101. The sensors 201 along with the control unit of the victim vehicle 101 may generate first sensor data. In some example embodiments, one or more sensors 203 may be present in the culprit vehicle 103. The sensors 203 of the culprit vehicle 103 generate the first sensor data and second sensor data and further, transmit the first sensor data and the second sensor data to an OEM cloud 205. The first sensor data from the victim vehicle 101 and/or the culprit vehicle 103 may refer to crash sensor data indicative of a collision of the victim vehicle 101 with the culprit vehicle 103. The emergency response system 207 may determine occurrence of an emergency event, such as, a collision from the first sensor data of the victim vehicle 101 and/or the culprit vehicle 103. In an embodiment, the emergency response system 207 obtains the second sensor data generated by the sensors 203 of the culprit vehicle 103 from the OEM cloud 205 over the network 211, after triggering of a crash sensor of the victim vehicle 101 and/or the culprit vehicle 103. In other words, the emergency response system 207 obtains the second sensor data from the victim vehicle 101 and/or the culprit vehicle 103 only after detecting occurrence of an emergency event using the first sensor data.

In some example embodiments, the sensors 201 of the victim vehicle 101 and the sensors 203 of the culprit vehicle 103 may include, but are not limited to, crash sensors, RADAR, LIDAR, Global Positioning System (GPS), video devices, imaging devices, cameras, audio recorders, and computer vision. The sensors 201 and 203 may also include motion sensors, inertia sensors, image capture sensors, proximity sensors, ultrasonic sensors, gyroscopes, etc., that detect conditions of vehicle, such as speed, acceleration, gear, braking, and other conditions related to the operation of vehicle. In some embodiments, the sensors 201 and/or sensors 203 may detect presence of a driver and one or more passengers in the victim vehicle 101 and/or culprit vehicle 103, respectively. In some example embodiments, the sensors 201 and/or the sensors 203 may detect the presence of fastened seatbelts, the weight in each seat in the victim vehicle 101 and/or culprit vehicle 103, heat signatures of the victim vehicle 101 and/or culprit vehicle 103, or any other method of detecting information about the driver and the passengers in the victim vehicle 101 and/or culprit vehicle 103, respectively. In some example embodiments, the sensors 201 and the sensors 203 may include flame sensors, which may detect fire in the victim vehicle 101 and/or culprit vehicle 103, respectively.

The first sensor data comprises crash sensor data, etc., associated with the victim vehicle 101 and/or the culprit vehicle 103. Similarly, the second sensor data comprises location data, speed data, lane data, etc., associated with the culprit vehicle 103. Further, a plurality of sensors 229, apart from the sensors 201 and 203, positioned in the vicinity of the emergency event, may generate the second sensor data associated with the culprit vehicle 103. In some embodiments, the sensors 201 and 203 use communication signals for generating the location data of the victim vehicle 101 and the culprit vehicle 103. The location data may be obtained from a positioning system, a Global Navigation Satellite System, such as the GPS, Galileo, GLONASS, BeiDou, etc., cellular tower location methods, access point communication fingerprinting such as Wi-Fi or Bluetooth based radio maps, or the like. The location data collected by the sensors 201 and 203 may be used to gather information related to an environment of the victim vehicle 101 and 103, such as, site of the road accident between the victim vehicle 101 and the culprit vehicle 103.

In an embodiment, vehicle data, also referred to herein as "probe data", may be collected by any device in the victim vehicle 101 and the culprit vehicle 103 and capable of determining the necessary information, and providing the necessary information to a remote entity. The user device 217 is one example of such device that may function as a probe to collect probe data of the victim vehicle 101 and the culprit vehicle 103. More specifically, the probe data collected by the user device 217 may be representative of the location of the victim vehicle 101 and the culprit vehicle 103 at a respective point in time and may be collected while the victim vehicle 101 and the culprit vehicle 103 traveling along a route, respectively. According to the example embodiment described below with the probe data being from the motorized victim vehicle 101 and the motorized culprit vehicle 103 traveling along roadways, the probe data may include, without limitation, the location data, (e.g. a latitudinal, longitudinal position, and/or height, GNSS coordinates, proximity readings associated with a radio frequency identification (RFID) tag, or the like), the rate of travel, (e.g. speed), the direction of travel, (e.g. heading, cardinal direction, or the like), the device identifier, (e.g. vehicle identifier, user identifier, or the like), a time stamp associated with the sensor data collection, rate of acceleration/deceleration in three axes, angle of impact, deployment of inflatable restraints (airbags) detected by air pressure wave sensor, or the like. The user device 217, may be any device capable of collecting the aforementioned probe data. While probe data is described herein as being vehicle probe data, example embodiments may be implemented with pedestrian probe data and non-motorized vehicle probe data (e.g., from bicycles, skate boards, etc.) and such probe data may be used in collisions between the motorized culprit vehicle 103 with a stationary or a mobile pedestrian or non-motorized vehicles such as bicycles, skateboards, etc.

The emergency response system 207 obtains the first sensor data, mainly the crash sensor data from the sensors 201 and/or the sensors 203, indicating occurrence of an emergency event, such as a collision. In some example embodiments, the triggering of the crash sensor causes deployment of inflatable restraints (airbags) in the victim vehicle 101 or the culprit vehicle 103 that is indicative of the collision and the control unit of the victim vehicle 101 or the culprit vehicle 103 generates the crash sensor data. The emergency response system 207 obtains the second sensor data from the victim vehicle 101 and/or the OEM cloud 205 over the network 211. In some example embodiments, the emergency response system 207 obtains the first sensor data also from the OEM cloud 205. In an embodiment, the emergency response system 207 may retrieve the first sensor data and the second sensor data from the OEM cloud 205, and/or map data from a map database 215 in the mapping platform 213 in real-time or near real-time, continuously, periodically, according to a schedule, on demand, etc. In some example embodiments, the emergency response system 207 obtains the second sensor data from the sensors 201 and/or 203 via the network 211. In other words, the emergency response system 207 obtains the second sensor data from the OEM cloud 205 after triggering of the crash sensor in the victim vehicle 101 and/or the culprit vehicle 103. That is, the emergency response system 207 may retrieve the first sensor data and the second sensor data directly from the victim vehicle 101 and/or the culprit vehicle 103 with connected communications capabilities (e.g., cellular or other wireless communications equipped vehicles) or from an Original Equipment Manufacturer (OEM) provider (e.g., automobile manufacturer) operating a OEM platform (e.g., a services platform 123) that collects the first sensor data and the second sensor data from the victim vehicle 101 and/or the culprit vehicle 103 manufactured by or otherwise associated with the OEM.

The network 211 may be wired, wireless, or any combination of wired and wireless communication networks, such as cellular, Wi-Fi, internet, local area networks, or the like. In one embodiment, the network 211 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth©, Internet Protocol (IP) data casting, satellite, mobile ad-hoc network (MANET), and the like, or any combination thereof.

The environment 200 further includes an emergency response database 209 that may store the first sensor data and the second sensor data. In some example embodiments, the emergency response database 209 stores data that may include, number of occupants in the victim vehicle 101, position of the occupants in the victim vehicle 101, biographical data of the occupants in the victim vehicle 101, medical history of the occupants in the victim vehicle 101, etc. The data stored in the emergency response database 209 apart from the first sensor data and the second sensor data may be pre-fed by an owner of the victim vehicle 101. In an embodiment, the sensors 201, such as, the imaging device in the victim vehicle 101 may perform facial recognition on the occupants of the victim vehicle 101 and may fetch and store the biographical data and the medical history of the occupants from external data sources, such as, the OEM cloud 205, user devices of the occupants, etc. The emergency response database 209 may further store contact information of one or more emergency services providers, such as, a towing service provider, an emergency medical service provider, police station, fire brigade, and/or some emergency contacts of each of the occupants in the victim vehicle 101. Such contact information may also be input by the owner of the victim vehicle 101 or by an external agency.

The map database 215 of a mapping platform 213 may include node data, road segment data or link data, point of interest (POI) data, posted signs related data, or the like. The map database 215 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 215 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 215 can include data about the POIs and their respective locations in the POI records. The map database 215 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 215 can include event data (e.g., traffic incidents, construction activities, scheduled events, unscheduled events, etc.) associated with the POI data records or other records of the map database 215 associated with the mapping platform 213. The data related to roads may be fetched by the mapping platform 213 from external systems, such as, the municipalities. In an embodiment, the map database 215 may hold a local replica or a cached version of information available in a plurality of external databases, such as, the emergency response database 209. In some example embodiments, the map database 215 may be a cached version of a map database hosted in a cloud.

A content provider such as a map developer may maintain the mapping platform 213. By way of example, the map developer may collect geographic data to generate and enhance the mapping platform 213. There may be different ways used by the map developer to collect data. These ways may include obtaining data from other sources, such as municipalities or respective geographic authorities. In addition, the map developer may employ field personnel to travel by vehicle employing the user equipment along roads throughout the geographic region to observe features and/or record information about them. For example, crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform the map database 215 of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure.

The map database 215 of the mapping platform 213 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing determination of history of POIs, one or more routes through an area and navigation-related functions and/or services through the area, such as, route calculation, route guidance, map display, speed calculation, distance and travel time functions, and other functions, by a navigation device, such as by the user device 217. The navigation-related functions may be corresponding to vehicle navigation, pedestrian navigation, navigation to a favored parking spot or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases. The mapping platform 213 may be used with the end user device, that is, the user device 217 to provide the user with navigation features. In such a case, the mapping platform 213 may be downloaded or stored on the user device 217 which may access the mapping platform 213 through a wireless or wired connection, over the network 211.

In some example embodiments, the user device 217 may be present in the victim vehicle 101 as an in-vehicle navigation system, such as, an infotainment system. In some example embodiments, the user device 217 may be in possession of an occupant in the victim vehicle 101. The user device 217 may be a personal navigation device (PND), a portable navigation device, a cellular telephone, a smart phone, a personal digital assistant (PDA), a laptop computer, tablet computer, a watch, a camera, a workstation, and/or other device that can perform navigation-related functions, such as digital routing and map display on a user interface 221 of an application 219, for example, a mapping application. The emergency response system 207 communicates with the occupants of the victim vehicle 101 via the user interface 221 of the user device 217 over the network 211. A user device, similar to the user device 217 may be possessed by at least one recipient 223 of the emergency event notification, such as, police station, medical emergency team, fire brigade, etc. The emergency response system 207 may transmit the emergency event notification to the recipient 223 based on the emergency event.

The environment 200 further includes a services platform 225, which may be used to provide navigation related functions and services 225a-225i to the application 219 running on the user device 217 in the victim vehicle 101 or in possession of the occupants of the victim vehicle 101. The services 225a-225i may include such as navigation functions, speed adjustment functions, traffic related updates, weather related updates, warnings and alerts, parking related services, indoor mapping services, and the like. The services 225a-225i may be provided by a plurality of content providers 227a-227k. In some examples, the content providers 227a-227k may access various SDKs from the services platform 225 for implementing one or more services. In an example, the services platform 225 and the mapping platform 213 may be integrated into a single platform to provide a suite of mapping and navigation related applications for OEM devices, such as the user device 217. The user device 217 may be configured to interface with the services platform 225, the content provider's services 227a-227k, and the mapping platform 213 over the network 211. Thus, the mapping platform 213 and the services platform 225 may enable provision of cloud-based services for the user device 217, such as, for determining an emergency event and generating an emergency event notification on the user device 217 of the recipient 223. In an embodiment, the emergency response system 207 may obtain data associated with traffic signals in the vicinity of the site of collision between the victim vehicle 101 and the culprit vehicle 103 from the services platform 225. In some example embodiments, the emergency response system 207 obtains "stop signal" duration and "go signal" duration of the traffic signal in the vicinity of the site of collision at different instants of time throughout the day. The data associated with the traffic signals in the vicinity of the site of collision may include 'go signal' time duration of the traffic signals, 'stop signal' time duration of the traffic signals, operation condition of the traffic signals, rated speed of crossing the traffic signals, etc. The data associated with the traffic signals may be dynamically varying based on the traffic conditions in the vicinity of the site of collision and the emergency response system 207 fetches such data from the services platform 225, such as, an Open Location Platform.

FIG. 3 describes a block diagram of the emergency response system 207 exemplarily illustrated in FIG. 2, in accordance with one or more example embodiments. In some example embodiments, the emergency response system 207 may be locally positioned in the victim vehicle 101. In some example embodiment, the emergency response system 207 may be located remotely in a cloud and may communicate with a navigation system of the victim vehicle 101. The emergency response system 207 may include a processing means, such as, at least one processor 301, a storage means, such as, at least one memory 303, and a communication means, such as, at least one communication interface 305. The processor 301 may retrieve computer program code instructions that may be stored in the memory 303 for execution of the computer program code instructions.

The processor 301 may be embodied in a number of different ways. For example, the processor 301 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 301 may include one or more processing cores configured to perform independently. A multi-core processor may enable multiprocessing within a single physical package. Additionally or alternatively, the processor 301 may include one or more processors configured in tandem via the bus to enable independent execution of instructions, pipelining, and/or multithreading.

Additionally or alternatively, the processor 301 may include one or more processors capable of processing large volumes of workloads and operations to provide support for big data analysis. In an example embodiment, the processor 301 may be in communication with a memory 303 via a bus for passing information among components of the emergency response system 207. The memory 303 may be non-transitory and may include, for example, one or more volatile and/or non-volatile memories. In other words, for example, the memory 303 may be an electronic storage device (for example, a computer readable storage medium) comprising gates configured to store data (for example, bits) that may be retrievable by a machine (for example, a computing device like the processor 301). The memory 303 may be configured to store information, data, content, applications, instructions, or the like, for enabling the emergency response system 207 to carry out various functions in accordance with an example embodiment of the present invention. For example, the memory 303 could be configured to buffer input data for processing by the processor 301. As exemplarily illustrated in FIG. 3, the memory 303 may be configured to store instructions for execution by the processor 301. As such, whether configured by hardware or software methods, or by a combination thereof, the processor 301 may represent an entity (for example, physically embodied in circuitry) capable of performing operations according to an embodiment of the present invention while configured accordingly. Thus, for example, when the processor 301 is embodied as an ASIC, FPGA or the like, the processor 301 may be specifically configured hardware for conducting the operations described herein. Alternatively, as another example, when the processor 301 is embodied as an executor of software instructions, the instructions may specifically configure the processor 301 to perform the algorithms and/or operations described herein when the instructions are executed. However, in some cases, the processor 301 may be a processor specific device (for example, a mobile terminal or a fixed computing device) configured to employ an embodiment of the present invention by further configuration of the processor 301 by instructions for performing the algorithms and/or operations described herein. The processor 301 may include, among other things, a clock, an arithmetic logic unit (ALU) and logic gates configured to support operation of the processor 301.

In some embodiments, the processor 301 may be configured to provide Internet-of-Things (IoT) related capabilities to users of the emergency response system 207 disclosed herein, such as, recipients of the emergency event notification. The IoT related capabilities may in turn be used to provide smart city solutions by providing assistance in nabbing culprit vehicles, in case of hit-and-run accidents. In some embodiments, the emergency response system 207 may be configured to provide an environment for development of strategies and recommendation solutions for emergency management in case of road accidents, in accordance with the embodiments disclosed herein. The environment may be accessed using the communication interface 305. The communication interface 305 may provide an interface for accessing various features and data stored in the emergency response system 207.

The processor 301 of the emergency response system 207 deployed in the victim vehicle 101 or in communication with the victim vehicle 101 of FIGS. 1A-1B performs the steps of generating emergency event notification data. The victim vehicle 101 may be stationary or in motion as illustrated in FIGS. 1A-1B. In some example embodiments, the victim vehicle 101 and the culprit vehicle 103 may be, but not limited to, a bicycle, motorbike, car, truck, bus, van, etc. The culprit vehicle 103 may be travelling in the same direction or in the opposite direction to that of the victim vehicle 101. The emergency response system 207 may be communicatively coupled with one or more sensors 201 of the victim vehicle 101, one or more sensors 203 of the culprit vehicle, and one or more sensors installed in the vicinity of site of collision. The first sensor data of victim vehicle 101 or the culprit vehicle 103 may include crash sensor data. The processor 301 obtains the first sensor data of the victim vehicle 101 or the culprit vehicle 103, when the culprit vehicle 103 collides with the victim vehicle 101. The crash sensor data indicates deployment of the air bags of the victim vehicle 101 or the culprit vehicle 103. The first sensor data of the victim vehicle 101 further includes the location data and speed data associated with the victim vehicle 101. The sensors 229, such as, cameras, microphones, traffic counters, etc., at the site of collision may detect the occurrence of collision from the noise generated on collision, smoke emanating from the spot of collision, in case of fire, traffic at the site of collision, speed data of vehicles moving past the site of collision, etc. The emergency response system may obtain such first sensor data indicative of a collision, from the sensors 229 at the site of collision. In some example embodiments, the crash sensor may detect impacts to the victim vehicle 101 or the culprit vehicle 103, including the amount of force, the direction of impact, and deployment of airbags. Based on the first sensor data associated with the emergency event, that is, deployment of the air bags due to the collision, the processor 301 obtains third sensor data associated with the emergency event. In some example embodiments, the third sensor data may include conditions of the victim vehicle 101, such as, acceleration data, gear data, braking data, and other conditions related to the operation of the victim vehicle 101 until and after the collision of the victim vehicle 101 with the culprit vehicle 103. Additionally, the third sensor data may include data of presence of a driver and one or more passengers in the victim vehicle 101, presence of fastened seatbelts, weight in each seat in the victim vehicle 101, heat signatures in the victim vehicle 101, or any information about driver and passengers in the victim vehicle 101. The processor 301 may deduce a discrepancy in heat signatures in the victim vehicle 101 to be an indicator of fire in the victim vehicle 101. In some embodiments, the third sensor data may include data provided by one or more of flame sensors, smoke sensors, water sensors that indicates a respective emergency event of fire or submergence under water. The processor 301 obtains the location of collision from the location data of the victim vehicle 101.

The processor 301 may obtain second sensor data from the victim vehicle 101 and/or the culprit vehicle 103 from the OEM cloud 205 via the network 211, after obtaining the crash sensor data of the victim vehicle 101 and/or the culprit vehicle 103. The second sensor data may include at least one of the speed data, the lane data, the location data, and the traffic signal data of the culprit vehicle 103 as disclosed in the detail description of FIG. 2 after the occurrence of the collision. The occurrence of collision may trigger the sensors 201 of the victim vehicle 101, the sensors 203 of the culprit vehicle 103, and/or the sensors 229 in the vicinity of the site of collision to capture the second sensor data for determining the vehicle behavior of the culprit vehicle 103.

The lane data comprises identification of lane on a roadway in which the culprit vehicle 103 is positioned. The traffic signal data of the culprit vehicle 103 comprises halt time of the culprit vehicle 103 at the traffic signal in the vicinity of the site of collision, speed of crossing the traffic signal by the culprit vehicle 103, etc. The sensors 229 may be positioned at the traffic signal in the vicinity of the site of collision and the sensors 229 may generate traffic signal data of the culprit vehicle 103.

Additionally, the second sensor data of the culprit vehicle 103 may also include direction of vehicle travel, rate of acceleration/deceleration data, angle of impact on the culprit vehicle 103, deployment of inflatable restraints (airbags) in the culprit vehicle 103, and other types of information and data. The processor 301 further obtains the map data from the map database 215 through the network 211. The map data comprises the POIs in the vicinity of the location of collision, location of traffic signals relative to the location of the site of collision, speed limits on roadways at the location of the site of collision, roadwork zones in the vicinity of the location of the site of collision, locations of speed bumps, speed limit signs, and other traffic signs or lane markings in the vicinity of the location of the site of collision, etc. In an embodiment, the processor 301 may obtain the first sensor data and the second sensor data from the emergency response database 209 via the network 211.

In some example embodiments, the processor 301 determines the vehicle behavior of the culprit vehicle 103, based on the obtained second sensor data. The processor 301 determines the vehicle behavior of the culprit vehicle 103 based on one or more of the speed data, the location data, the lane data, or the traffic signal data over a duration of time after the occurrence of a collision between the victim vehicle 101 and the culprit vehicle 103. The vehicle behavior of the culprit vehicle 103 may be valid if the culprit vehicle 103 may stop and negotiate, rather than abscond after the collision with the victim vehicle 101. This may be detected by the processor by comparing the rate of change of speed data over a first time period with a threshold. For example, if the rate of change of speed data is less than zero it indicates that the culprit vehicle 103 is decelerating (indicative of stopping of the culprit vehicle 103). Alternately or additionally, the processor 301 may detect lane change data based on position data of the culprit vehicle obtained over a second period of time and discern from the lane change data, whether the culprit vehicle moved from a slow lane to a faster lane (indicating hit and run) or from a fast lane to a slower lane (indicative of stopping of the culprit vehicle 103). Alternately or additionally, the aforesaid objective may be achieved using the position data of the culprit vehicle 103 obtained for a third period of time, which may indicate that the vehicle may or may not be stopping. Additionally or alternately, the processor 301 may obtain traffic signal data over a fourth period of time and the position data of the culprit vehicle 103 and may correlate the two to determine whether the vehicle jumped the traffic signal or not. Thus, using one or more of the above approaches, the processor 301 may determine whether the behavior of the culprit vehicle 103 is valid or not.

The processor 301 processes the speed data of the culprit vehicle 103 to determine a change in the speed data of the culprit vehicle 103 over a first time period after the collision with the victim vehicle 101. The first time period may refer to time instant immediately after the collision or duration of time after the collision. The processor 301 may compare the speed data of the culprit vehicle 103 from the instant of collision to the speed data over the first time period after the collision. In some example embodiments, for example, if the culprit vehicle 103 accelerates or increases the speed after the collision has occurred, the processor 301 may deduce that the culprit vehicle 103 is trying to run or escape after the collision. In some example embodiments, if the culprit vehicle 103 continues to travel at the same speed as the speed at the time of the collision, the processor 301 may deduce that the culprit vehicle 103 may try to run or escape from the site of collision. In an embodiment, if the culprit vehicle 103 reduces the speed and comes to a halt, the processor 301 may deduce that the culprit vehicle 103 may be extensively damaged or the passengers or the driver of the culprit vehicle 103 may be injured. However, an increase in the speed of the of the culprit vehicle 103 after the collision may not always indicate that the culprit vehicle 103 is trying to run or escape. For example, the culprit vehicle 103 may stop after certain distance or from the site of collision due to the traffic conditions or due some other reason. The culprit vehicle 103 may reduce speed after some time period. Hence, the processor 301 may compute change in the speed data of the culprit vehicle 103 over the first time period. The processor 301 stores the computed change in speed data in the memory 303 or may be in the emergency response database 209.

In some example embodiments, the processor 301 may generate emergency event notification data based on the rate of the change in speed data of the culprit vehicle 103 over the first time period. The processor 301 may generate emergency event notification data corresponding to the victim vehicle 101 indicating the damage caused to the victim vehicle 101 and the extent of injury caused to the occupants of the victim vehicle 101. If the processor 301 determines that the rate of change in the speed data of the culprit vehicle 103 over the first time period is less than or equal to zero, the processor 301 generates the emergency event notification data corresponding only to the victim vehicle 101. The processor 301 determines the vehicle behavior of the culprit vehicle 103 to be valid since the culprit vehicle 103 does not accelerate away from the site of the collision. If the processor 301 determines that the rate of change in the speed over the first time period is greater than zero, the processor 301 generates the emergency event notification data corresponding to the victim vehicle 101 and the culprit vehicle 103, since the processor 301 determines the vehicle behavior of the culprit vehicle 103 to be invalid.

The processor 301 retrieves the lane data of the culprit vehicle 103 at the time of collision from the OEM cloud 205 or the sensors 202, 203, or 229 and the processor 301 determines a change in the lane data of the culprit vehicle 103 based on the retrieved lane data over the second time period. The second time period may refer to time instant immediately after the collision or duration of time after the collision. For example, the culprit vehicle 103 may change the lane after some time duration due some traffic issues on the current lane in which it is travelling. The change in the lane data may indicate a change in lane performed by the culprit vehicle 103 or no change in the current lane of travel of the culprit vehicle 103 after the collision. In some example embodiments, the change in the lane data of the culprit vehicle 103 may indicate that the culprit vehicle 103 is changing from the current lane in order to slow down and stop. In an embodiment, the culprit vehicle 103 may not change from the current lane and continue or stop in the current lane. If the processor 301 determines that there is no change in the lane data, the processor 301 may deduce that the victim vehicle 101 and the culprit vehicle 103 may not be damaged or broken down in the current lane or the severity of the collision is minimum, resulting in no blockage of the current lane. The processor 301 stores the computed change in lane data by the emergency response system 207 in the memory 302 or may be in the emergency response database 209.

In some example embodiments, the processor 301 may generate emergency event notification data based on the change in lane data of the culprit vehicle 103 over the second time period. The processor 301 may determine a presence or an absence of change in the lane data over the second time period. In some example embodiments, if the processor 301 determines the presence of change in the lane data of the culprit vehicle 103 over the second time period, the processor 301 generates the emergency event notification data corresponding to the victim vehicle 101 indicating the victim vehicle 101 may be damaged and the occupants may be injured. The processor 301 may determine the vehicle behavior of the culprit vehicle 103 to be valid, since the culprit vehicle 103 changes from the current lane to halt. The processor 301 may further generate the emergency event notification data corresponding to the culprit vehicle 103 indicating the culprit vehicle 103 may be trying to stop and negotiate. If the processor 301 determines the absence of change in the lane data of the culprit vehicle 103 over the second time period, the processor 301 generates the emergency event notification data corresponding to the victim vehicle 101 indicating the victim vehicle 101 may be damaged and the occupants may be injured. The processor 301 may further generate the emergency event notification data corresponding to the culprit vehicle 103 indicating the culprit vehicle 103 may be trying to abscond. Based on the generated emergency event notification data, the processor 301 may further determine at least one recipient 223, such as, the police department, the hospital, etc., to transmit respective emergency event notification data.

The processor 301 processes the location data of the culprit vehicle 103 from the OEM cloud 205 or the sensors 202, 203, or 229 via the network 211 after the collision with victim vehicle 101. The processor 301 may compare the location data of the culprit vehicle 103 from the time instant of collision to the location data over a third time period after the collision. The location data of the culprit vehicle 103 at the time instant of the collision is the location of site of the collision, that is, the emergency event. The third time period may refer time instant immediately after the collision or duration of time after the collision. If the culprit vehicle 103 tries to abscond, the culprit vehicle 103 may be displaced from the site of the collision and the processor 301 may determine the vehicle behavior of the culprit vehicle 103 to be invalid. The processor 301 may, in an embodiment, compare a current location of the culprit vehicle 103 obtained from the OEM cloud 205 with the location of the site of collision to compute the distance travelled by the culprit vehicle 103, in order to determine whether the culprit vehicle 103 tried to run after the collision. The processor 301 stores the computed change in the location data of the culprit vehicle 103 in the memory 302 or may be in the emergency response database 209.

In some example embodiments, the processor 301 may generate emergency event notification data based on the change in location data of the culprit vehicle 103 over the third time period. The processor 301 may determine a presence or an absence of the change in location data of the culprit vehicle 103 over the third time period. In some example embodiments, if the processor 301 determines the absence of change in location data over the third period of time, the processor 301 deduces the vehicle behavior of the culprit vehicle 103 to be valid. Since there is no change in the location data of the culprit vehicle 103, the culprit vehicle 103 may halt after the collision, either to negotiate or the culprit vehicle 103 may be severely damaged. The processor 301 may generate the emergency event notification data corresponding to the victim vehicle 101 indicating the victim vehicle 101 may be damaged and the occupants may be injured. If the processor 301 determines the presence of change in the location data of the culprit vehicle 103 after the collision over the third time period, the processor 301 generates emergency event notification data corresponding to the victim vehicle 101 and the culprit vehicle 103 indicating the culprit vehicle 103 may be trying to abscond. Based on the generated emergency event notification data, the processor 301 may further determine at least one recipient 223, such as, the police department, the hospital, etc., to transmit respective emergency event notification data.

In some example embodiments, the processor 301 may determine the traffic signal data of the culprit vehicle 103 using the map data from the map database 215 via the network 211. The processor 301 may determine the traffic signal data of the culprit vehicle 103 using the map data associated with the traffic signal and the dynamic data associated with the traffic signal from the services platform 225 in the vicinity of site of the collision, over a fourth time period. The fourth time period may refer to time instant immediately after the collision or duration of time after the collision. From the map database 215, based on the direction of travel of the culprit vehicle 103 and the location of the site of collision, the processor 301 identifies at least one traffic signal, the culprit vehicle 103 may cross to abscond or stop. For the identified at least traffic signal, the processor 301 may further obtain dynamic data associated with the traffic signal from the services platform 225. The processor 301 may determine the traffic signal data of the culprit vehicle 103, such as, halt time of the culprit vehicle at the traffic signal, speed of crossing the traffic signal, etc., based on the location of the identified traffic signal relative to the location of the site of collision, the speed of the culprit vehicle after the collision, and the "stop signal" duration and the "go signal" duration of the identified at least one traffic signal. The processor 301 may compare the traffic signal data of the culprit vehicle 103 with the "stop signal" duration and the "go signal" duration of the identified at least one traffic signal.

In some example embodiments, the traffic signal data may indicate whether the culprit vehicle 103 crossed the traffic signal in the vicinity of the site of collision after the collision. However, the crossing of the traffic signal in the vicinity of the site of collision by the culprit vehicle 103 during a 'go signal' of the traffic signal may not always indicate the escape of the culprit vehicle 103 after the collision. The culprit vehicle 103 may stop after crossing the traffic signal. However, an inadvertent crossing of the traffic signal during a "stop signal" or a hurried crossing of the traffic signal during a "go signal" may indicate the escape of the culprit vehicle 103 after the collision.

In some example embodiments, the processor 301 may generate emergency event notification data based on the traffic signal data over the fourth time period. The processor 301 may determine whether the culprit vehicle 103 crossed the traffic signal in the vicinity of site of collision during a "stop signal" or a "go signal". The processor 301 generates the emergency event notification data corresponding only to the victim vehicle 101 indicating that the victim vehicle 101 may be damaged and the occupants may be injured, if the culprit vehicle 103 halts at the traffic signal during the duration of the "stop signal" at the traffic signal. The processor 301 may generate the emergency event notification data corresponding to the culprit vehicle 103 and the victim vehicle 101, if the culprit vehicle 103 may not halt on the "stop signal" of the traffic signal or may cross the traffic signal at an accelerated pace during the "go signal" duration of the traffic signal. The processor 301 generates the emergency event notification data corresponding to the victim vehicle 101 and the culprit vehicle 103 indicating the culprit vehicle 103 may be trying to abscond. Based on the generated emergency event notification data, the processor 301 may further determine at least one recipient 223, such as, the police department, the hospital, etc., to transmit respective emergency event notification data.

In some example embodiments, the first time period, the second time period, the third time period, and the fourth time period may be equal or different from each other. The processor 301 may determine the vehicle behavior of the culprit vehicle 103 based on a combination of the change in the speed data, the change in the lane data, the change in the location data, and/or the traffic data over different time periods and accordingly, generate the emergency event notification data corresponding to the victim vehicle 101 and the culprit vehicle 103.

Based on the vehicle behavior of the culprit vehicle 103, the processor 301 may generate emergency event notification data. The emergency event notification data indicates an occurrence of an emergency event, such as, a collision between the victim vehicle 101 and the culprit vehicle 103. The emergency event notification data corresponding to the victim vehicle 101 comprises data related to the emergency event, extent of damages to the victim vehicle 101 and severity of injuries to the occupants of the victim vehicle 101, and the data stored in the emergency response database 209 apart from the first sensor data and the second sensor data. The data related to the emergency event may comprise location of the emergency event, vehicle identification information of the victim vehicle 101 and the culprit vehicle 103, insurance policy information of the victim vehicle 101 and the culprit vehicle 103, number of victim vehicles, such as, 101 involved in the emergency event, mode of driving of the victim vehicle 101 and/or the culprit vehicle 103 (such as autonomous mode or non-autonomous mode), data related to the vehicle behavior of the culprit vehicle 103 indicating whether the culprit vehicle 103 stopped after the collision or tried to escape after the collision, etc. The data related to the damages to the victim vehicle 101 may comprise minor damages, moderate damages, and the major damages. The minor damages may be scratches, or scrapes, for example, a cracked headlight or small dent in the body of the victim vehicle 101. The moderate damages may be large dents in the hood, fender or door in the victim vehicle 101. The major damages may include broken axles and bent or twisted frames of the victim vehicle 101, dislocation, such as, roll over, of the victim vehicle 101, or damage to a complete side of the victim vehicle 101. The data related to injuries to the occupants of the victim vehicle 101 may be sensed by the sensors 201 mounted on at least one part of the victim vehicle 101 or the sensors 229 in the vicinity of the site of collision. The data related to the injuries to the occupants includes severity of the injury, such as, major injury or minor injury, data related to displacement of the occupants from their respective seats in the victim vehicle 101, etc. The data from the emergency response database 209 may comprise medical history of the occupants, biographical information of the occupants like age, weight, height, sex, blood group, etc., and contact information of emergency contacts of the occupants in the victim vehicle 101, etc.

The emergency event notification data corresponding to the culprit vehicle 103 comprises data related to the emergency event and optionally, the extent of damages to the culprit vehicle 103. The data related to the emergency event may comprise location of the emergency event, vehicle identification information of the victim vehicle 101 and the culprit vehicle 103, insurance policy information of the victim vehicle 101 and the culprit vehicle 103, number of victim vehicles, such as, 101 involved in the emergency event, mode of driving of the victim vehicle 101 and/or the culprit vehicle 103 (such as, autonomous mode or non-autonomous mode), data related to the vehicle behavior of the culprit vehicle 103 indicating whether the culprit vehicle 103 stopped after the collision or tried to escape after the collision, etc. The data related to the damages to the culprit vehicle 103 may comprise minor damages, moderate damages, and the major damages. The minor damages may be scratches, or scrapes, for example, a cracked headlight or small dent in the body of the culprit vehicle 103. The moderate damages may be large dents in the hood, fender or door in the culprit vehicle 103. The major damages may include broken axles and bent or twisted frames of the culprit vehicle 103, dislocation, such as, roll over, of the culprit vehicle 103, or damage to a complete side of the culprit vehicle 103.

In some example embodiments, based on the third sensor data associated with the emergency event, the processor 301 may generate emergency event notification data, such as, the data related to the emergency event, the extent of damages to the victim vehicle 101 and the severity of injuries to the occupants of the victim vehicle 101, and the data stored in the emergency response database 209 corresponding to the victim vehicle 101. The processor 301 may, further, enquire about the wellbeing or severity of injuries to the occupants of the victim vehicle 101 through the user device 217 associated with the victim vehicle 101 and/or the user device 217 possessed by the occupants of the victim vehicle 101. The processor 301 may render a fitness status query on the user device 217 as exemplarily illustrated in FIGS. 4A-4B.

In some example embodiments, the processor 301 may transmit at least one emergency event notification based on the generated emergency event notification data corresponding to the victim vehicle 101 and the culprit vehicle 103, to at least one recipient 223 based on the emergency event. The emergency event notification may be an e-mail, a short message service (SMS) message, a multimedia message, a phone call, etc. The processor 301 may retrieve and transmit the data from the emergency response database 209, such as, the contact information of recipients 223, the medical history of the occupants in the victim vehicle 101, the biographical data of the occupants of the victim vehicle 101, etc., via the network 211 to recipient 223. The recipient 223 may be one or more emergency services providers, such as, a towing service provider, an emergency medical service provider, such as, a hospital, a law enforcement body, such as, the police station, the fire brigade, an insurance service provider associated with the victim vehicle 101 and the culprit vehicle 103, and/or some other emergency responder. In some example embodiments, the recipient 223 may possess a user device, such as, 217 to communicate with the emergency response system 207 using the user interface 221 via the network 211. In an embodiment, the recipient 223 may communicate with the occupants of the victim vehicle 101 and the culprit vehicle 103 via the user device 217, such as, the infotainment system in the victim vehicle 101 and the culprit vehicle 103. The processor 301 may transmit the emergency event notification comprising the generated emergency event notification data corresponding to the culprit vehicle 103, such as, the data related to the emergency event to the recipient 223, such as, the police department and the data related to the damages of the culprit vehicle 103 to the recipient 223, such as, the hospital and/or the towing service provider in the vicinity of the site of the collision. The processor 301 may transmit the generated emergency event notification comprising the generated emergency event notification data corresponding to the victim vehicle 101, such as, the data related to the emergency event to the recipient 223, such as, the police department, the insurance service provider, etc. Similarly, the processor 301 may transmit the data related to the damages of the victim vehicle 101 to the recipient 223, such as, the hospital and/or the towing service provider in the vicinity of the site of the collision. The processor 301 may transmit the data related to the injuries to the occupants of the victim vehicle 101 to the recipients 223, such as, the hospital and emergency contacts along with the medical history data, and the biographical data, such as blood group, allergies of the occupants, etc., from the emergency response database 209. In some example embodiments, for example, if the culprit vehicle 103 tries to run or escape after the collision, the processor 301 may transmit the emergency event notification based on the vehicle behavior to the police department in the vicinity of the current location of the culprit vehicle 103.

The processor 301 of the emergency response system 207 in communication with the culprit vehicle 103 of FIG. 1C performs the steps of generating emergency event notification data. As exemplarily illustrated in FIG. 1C, when the culprit vehicle 103 collides with the stationary object, such as, the building structure 105, the processor 301 obtains the first sensor data from the sensors 203 of the culprit vehicle 103 and/or the sensors 229 in the vicinity of the site of collision. The crash sensor data of the culprit vehicle 103 or the sensor data from the sensors 229 may be obtained which is indicative of the collision. The processor 301 determines an emergency event, that is, a collision has occurred based on the first sensor data. The processor 301 determines vehicle behavior of the culprit vehicle 103 and may generate emergency event notification data corresponding to the culprit vehicle 103 similar to the emergency event notification data generated for the culprit vehicle 103 as disclosed above. Further, the processor 301 obtains third sensor data, such as, sensor data indicative of fire, associated with the emergency event, based on the third sensor data. The third sensor data comprising the data of presence of a driver and one or more passengers in the victim vehicle 101, the presence of fastened seatbelts, the weight in each seat in the victim vehicle 101, the heat signatures in the victim vehicle 101, or any information about driver and passengers in the victim vehicle 101 indicates the extent of damage to the victim vehicle 101 and the extent of injuries to the occupants of the victim vehicle 101. If the occupants of the victim vehicle 101 are displaced from their respective seats in the victim vehicle 101, the processor 301 confirms that the emergency event, such as, the collision of the victim vehicle 101. In case smoke is detected in the victim vehicle 101 or a discrepancy in the heat signature of the victim vehicle 101 is detected by the sensors 201 of the victim vehicle 101, the processor 301 may determine an incidence of fire in the victim vehicle 101. The processor 301 may generate emergency event notification data and may transmit emergency event notifications to one or more recipients 223, such as, the fire department, a hospital, the police department, a towing service provider, etc., in the vicinity of the emergency event.

Considering an example where a culprit vehicle 103 collides with a stationary object, may be a pedestrian, the pedestrian may be equipped with a user device 217, such as, a smart watch, a smart phone, a wristband, etc., comprising a plurality of sensors, such as, 201 that detect a sudden motion of the pedestrian, which indicates the pedestrian may be involved in a collision. In this scenario, the processor 301 may obtain first sensor data associated with the pedestrian, such as, different physiological parameters and images captured by imaging sensors, etc., and based on the first sensor data, the processor 301 obtains the second sensor data from the culprit vehicle 103 and/or the sensors 229. The processor 301 determines the vehicle behavior of the culprit vehicle 103 and may generate emergency event notification data corresponding to the pedestrian and the culprit vehicle 103 similar to the emergency event notification data generated for the victim vehicle 101 and the culprit vehicle 103 as disclosed for above. The processor 301 may further transmit emergency event notification to the recipients 223 to assist the pedestrian to get medical aid and police support and to nab the occupants or driver of the culprit vehicle 103, in case he/she tries to abscond.

If, in case, a stationary object, such as, a pole, a tree, etc., falls on a victim vehicle 101. The processor 301 of the emergency response system 207 performs the steps of generating emergency event notification data. The processor 301 obtains the first sensor data associated with the emergency event from the sensors 201 of the victim vehicle 101 and/or the sensors 229. The processor determines the emergency event based on the first sensor data. The crash sensor data of the victim vehicle 101 may be obtained which is indicative of the collision. The processor 301 obtains third sensor data associated with the emergency event, based on the first sensor data. The third sensor data comprising the data of presence of a driver and one or more passengers in the victim vehicle 101, the presence of fastened seatbelts, the weight in each seat in the victim vehicle 101, the heat signatures in the victim vehicle 101, or any information about driver and passengers in the victim vehicle 101 indicates the extent of damage to the victim vehicle 101 and the extent of injuries to the occupants of the victim vehicle 101. If the occupants of the victim vehicle 101 are displaced from their respective seats in the victim vehicle 101, the processor 301 confirms that the emergency event, such as, the collision of the victim vehicle 101. In case smoke is detected in the victim vehicle 101 or a discrepancy in the heat signature of the victim vehicle 101 is detected by the sensors 201 of the victim vehicle 101, the processor 301 may determine an incidence of fire in the victim vehicle 101. The processor 301 may generate emergency event notification data and may transmit emergency event notifications to one or more recipients 223, such as, the fire department, a hospital, the police department, a towing service provider, etc., in the vicinity of the emergency event.

FIGS. 4A and 4B illustrate screenshots of a fitness status query rendered on the user interface 221a of the user device 217 associated with the victim vehicle 101, in accordance with an example embodiment. The processor 301 may deduce that the victim vehicle 101 is affected by a collision that has taken place, from the first sensor data, that is, the deployment of the airbags in the victim vehicle 101. Based on the first sensor data, the processor 301 may obtain the third sensor data associated with emergency event as disclosed in the detail description of FIG. 3. The processor 301 may enquire the well-being of each of the occupants of the victim vehicle 101 through the fitness status query. In an embodiment, the processor 301 may determine the extent of damage caused to the victim vehicle 101 and its occupants through the fitness status query on the user device 217.

The fitness query may be a visual message or a voice message. The processor 301 may request for a confirmation from the occupant of the victim vehicle 101 about the occurrence of an emergency event, that is, a collision, as a part of the fitness status query. Based on the confirmation received from one or more occupants, the processor 301 may enquire about the well-being of each of the occupants of the victim vehicle 101. The processor 301 may render a message, such as, "Are you fine" on the user interface 221*a* of the user device 217 as illustrated in FIG. 4A. The occupants are provided with interactive buttons, such as, "Yes" or "No" as a part of the fitness status query. The processor 301 may receive from the user interface 221*a*, a fitness input corresponding to the fitness status query from the occupants of the victim vehicle 101. In some example embodiments, if an occupant presses "Yes" button, the processor 301 determines that emergency event may be a 'minor collision' and the occupants may not be severely injured. In this embodiment, the processor 301 may not transmit an emergency event notification to any of the recipients 223. Further, for the assistance of the occupants of the victim vehicle 101, the processor 301 may render a subsequent user interface 221*b* illustrated in FIG. 4B comprising emergency instruction, contact information of emergency contacts of the occupant, contact information of a police station, nearby towing stations, insurance agent, etc., in the vicinity of the site of the collision. The processor 301 may receive an input to this interface 221*b* and the processor 301 may transmit an emergency event notification to one of the recipients 223 selected by the occupant of the victim vehicle 101. In some example embodiments, if the processor 301 receives no response from the occupant of the victim vehicle 101 for the fitness status query within a predetermined time period (e.g. 30 seconds) or the occupant presses "No" button as the fitness input corresponding to the fitness status query, the processor 301 determines that the emergency event may be a 'major collision' and the occupants may be severely injured. The processor 301 may generate the emergency event notification data corresponding to the emergency event and may transmit an emergency event notification to at least one recipient 223, such as, the emergency contacts, for example, family members and friends of the occupants of the victim vehicle 101, a hospital, a police station, a towing service provider, etc.

In some example embodiments, the rendering of the fitness status query may additionally or alternately be in the form of audio through speakers. This may be of significant importance where occupants of the vehicle may be severely injured and may not be in a position to reach the visual interface to provide input via touch. In such cases, the response to the fitness status query from the occupant(s) may be received through microphone or other suitable transducers. If no response is received within a threshold time period after rendering of the fitness status query, the processor 301 determines that the emergency event may be a 'major collision' and the occupants may be severely injured. The processor 301 may generate the emergency event notification data corresponding to the emergency event and may transmit an emergency event notification to at least one recipient 223.

FIG. 5 illustrates a method for generating emergency event notification data, in accordance with an example embodiment. It will be understood that each block of the flow diagram of the method 500 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 303 of the emergency response system 207, employing an embodiment of the present invention and executed by at least one processor 301. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 500 illustrated by the flow diagram of FIG. 5 for generating emergency event notification data may include, at step 501, determining an emergency event based on first sensor data. The method 500, at step 503, may further include determining vehicle behavior of a first vehicle, that is, the culprit vehicle 103 based on the determined emergency event. At step 505, the method 500 may include generating the emergency event notification data corresponding to the emergency event, based on the determined vehicle behavior Further, the method 500 may include transmitting at least one emergency event notification to at least one recipient, based on the generated emergency event notification data.

In an example embodiment, a system for performing the method of FIG. 5 above may comprise a processor (e.g. the processor 301) configured to perform some or each of the operations (501-507) described above. The processor may, for example, be configured to perform the operations (501-507) by performing hardware implemented logical functions, executing stored instructions, or executing algorithms for performing each of the operations. Alternatively, the system may comprise means for performing each of the operations described above. In this regard, according to an example embodiment, examples of means for performing operations 501-507 may comprise, for example, the processor 301 and/or a device or circuit for executing instructions or executing an algorithm for processing information as described above.

On implementing the method 500 disclosed herein, the end result generated by the system is a tangible generation of emergency event notification data and transmission of an emergency event notification to at least one recipient. The emergency response system generates the emergency event notification data corresponding to the culprit vehicle based on the vehicle behavior of the culprit vehicle after an occurrence of an emergency event, such as, a collision. The emergency response system generates the emergency event notification data corresponding to the victim vehicle based on the vehicle behavior of the culprit vehicle and the third sensor data associated with the emergency event after an occurrence of an emergency event, such as, a collision. Based on the emergency event notification data, the emergency response system alerts the recipients by transmitting emergency event notification. The emergency response system is a fully automated system that may access contact information of hospitals, police stations, fire brigades, and towing service providers in different regions of an area stored in the map database and may transmit emergency event notification to the hospital, the police station, the fire brigade, and/or the towing service provider in the vicinity of the site of the collision. The emergency response system may access medical history of the occupants of the victim vehicle, the biographical data of the occupants of the victim vehicle from the emergency response database and provide the recipients, such as, the hospital with such information to enable the hospitals to be well equipped before arrival at the site of the collision. The transmission of the emergency event notification to the police station in correspondence to the behavior of the culprit vehicle, during such emergency events may deter future occurrence of hit and run cases. Such transmission of emergency event notification to the police station facilitates the police to nab the culprit vehicle in time and allows the police determine the severity of the accident efficiently, without being more dependent on the eye witness at the site of collision.

Example embodiments disclosed herein provide an improvement in emergency event management related to emergency events, such as, collision between vehicles. Especially, cases where quick response is critical to survival or safety of the vehicle and its occupants, the emergency event detection and response as described herein outperforms conventional response means and systems. In particular, embodiments of the present invention enable coherent operation between emergency detectors and emergency responders. Minor or major collisions occur on roadways and it is often difficult to nab the culprit vehicle, if the culprit vehicle does not stop. In case of major collisions, lives of the occupants of the occupants of the victim vehicle are lost if medical aid does not reach timely. Sometimes, the emergency event may occur in a remote location where it is difficult to assess the extent of damage to the vehicles involved. The emergency response system, in case of major collisions, may inform the hospitals, fire brigade, emergency contacts, etc., in real-time before the situation becomes adverse. In remote locations, the emergency response system generates the emergency event notification data that defines the extent of damage to the victim vehicle and ensures the occupants of the victim vehicle are fine through the fitness status query. Further, the emergency response system obtains the map data associated with the traffic signals from the service platform, such as the open location platform via the network to comprehend an absconding culprit vehicle involved in the collision.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for generating emergency event notification data, the method comprising:
   determining, by a processor, an occurrence of an emergency event based on first sensor data;
   determining, in real-time, vehicle behavior of a first vehicle involved in the emergency event, wherein the vehicle behavior includes changes in speed data and lane data; and
   generating the emergency event notification data corresponding to the determined emergency event, based on the determined vehicle behavior.

2. The method of claim 1, further comprising:
   obtaining the first sensor data from at least one of the first vehicle or a second vehicle, wherein one of the first vehicle or the first vehicle and the second vehicle is associated with the determined emergency event.

3. The method of claim 2, wherein determining the vehicle behavior of the first vehicle comprises:
   obtaining second sensor data from at least one of the first vehicle, the second vehicle, or an external source, based on the determined emergency event; and
   determining the vehicle behavior of the first vehicle, based on the first and second sensor data.

4. The method of claim 1, further comprising:
   obtaining third sensor data associated with the determined emergency event; and
   generating the emergency event notification data corresponding to the determined emergency event, based on the third sensor data.

5. The method of claim 1, wherein determining a validity of the vehicle behavior of the first vehicle comprises:
   determining the change in speed data of the first vehicle over a first time period;
   comparing the change in speed data with a pre-determined speed threshold;
   determining a deceleration or a stopping action by the first vehicle based on the change in speed data being less than zero;
   determining an acceleration by the first vehicle based on the change in speed data being greater than zero; and
   generating the emergency event notification based on the determination.

6. The method of claim 1, wherein determining a validity of the vehicle behavior of the first vehicle comprises:
   determining the change in lane data of the first vehicle over a second time period based on position data of the first vehicle;

determining a deceleration or a stopping action by the first vehicle based on movement of the first vehicle from a fast lane to a slow lane;
determining an acceleration by the first vehicle based on movement of the first vehicle from the slow lane to the fast lane; and
generating the emergency event notification based on the determination.

7. The method of claim 1, wherein determining a validity of the vehicle behavior of the first vehicle comprises:
determining a change in location data of the first vehicle over a third time period, wherein the location data includes position data, speed data, road attributes, or a combination thereof; and
generating the emergency event notification based on the determination.

8. The method of claim 1, wherein determining a validity of the vehicle behavior of the first vehicle comprises:
determining position data of the first vehicle and traffic signal data over a fourth time period;
comparing the position data of the first vehicle with the traffic signal data to determine whether the first vehicle jumped the traffic signal; and
generating the emergency event notification data based on the determination.

9. The method of claim 1, further comprising:
determining fitness status associated with the determined emergency event, wherein the generation of the emergency event notification data is further based on the determined fitness status.

10. The method of claim 1, further comprising:
determining driving mode information of the first vehicle involved in the emergency event, wherein the driving mode information includes an autonomous mode or a non-autonomous mode.

11. A system for generating emergency event notification data, the system comprising:
at least one memory configured to store computer program code instructions; and
at least one processor configured to execute the computer program code instructions to:
determine an occurrence of an emergency event, based on first sensor data;
determine, in real-time, vehicle behavior of a first vehicle involved in the emergency event, wherein the vehicle behavior includes changes in position data of the first vehicle relative to a traffic signal; and
generate the emergency event notification data corresponding to the determined emergency event, based on the determined vehicle behavior.

12. The system of claim 11, wherein the at least one processor is further configured to:
obtain the first sensor data from at least one of the first vehicle or a second vehicle, wherein one of the first vehicle or the first vehicle and the second vehicle is associated with the determined emergency event.

13. The system of claim 12, wherein to determine the vehicle behavior of the first vehicle, the at least one processor is further configured to:
obtain second sensor data from at least one of the first vehicle, the second vehicle, or an external source, based on the determined emergency event; and
determine the vehicle behavior of the first vehicle, based on the second sensor data.

14. The system of claim 11, wherein the at least one processor is further configured to:

obtain third sensor data associated with the determined emergency event; and
generate the emergency event notification data corresponding to the emergency event, based on the third sensor data.

15. The system of claim 11, wherein to determine a validity of the vehicle behavior of the first vehicle, the at least one processor is configured to:
determine a change in speed data of the first vehicle over a first time period;
compare the change in speed data with a pre-determined speed threshold;
determine a deceleration or a stopping action by the first vehicle based on the change in speed data being less than zero;
determine an acceleration by the first vehicle based on the change in speed data being greater than zero; and
generate the emergency event notification based on the determination.

16. The system of claim 11, wherein to determine a validity of the vehicle behavior of the first vehicle, the at least one processor is configured to:
determine a change in lane data of the first vehicle over a second time period based on position data of the first vehicle;
determine a deceleration or a stopping action by the first vehicle based on movement of the first vehicle from a fast lane to a slow lane;
determine an acceleration by the first vehicle based on movement of the first vehicle from the slow lane to the fast lane; and
generate the emergency event notification based on the determination.

17. The system of claim 11, wherein to determine a validity of the vehicle behavior of the first vehicle, the at least one processor is configured to:
determine a change in location data of the first vehicle over a third time period, wherein the location data includes position data, speed data, road attributes, or a combination thereof; and
generate the emergency event notification data based on the determination.

18. The system of claim 11, wherein to determine a validity of the vehicle behavior of the first vehicle, the at least one processor is configured to:
determine the position data of the first vehicle and traffic signal data over a fourth time period;
compare the position data of the first vehicle with the traffic signal data to determine whether the first vehicle jumped the traffic signal; and
generate the emergency event notification based on the determination.

19. The system of claim 11, wherein the at least one processor is further configured to:
determine fitness status associated with the determined emergency event, wherein the generation of the emergency event notification data is further based on the determined fitness status.

20. A method for generating emergency event notification data, the method comprising:
determining, by a processor, an emergency event based on first sensor data;
determining vehicle behavior of a first vehicle, based on the determined emergency event;
generating the emergency event notification data corresponding to the determined emergency event, based on the determined vehicle behavior;

controlling a user interface for outputting a fitness status query associated with the determined emergency event, based on the generated emergency event notification data;
receiving a fitness input corresponding to the fitness status query within a pre-determined time threshold;
determining a severity of the emergency event based on the fitness input or a lack of fitness input within the pre-determined time period; and
transmitting at least one emergency event notification to one or more emergency service providers, based on the generated emergency event notification data.

\* \* \* \* \*